May 16, 1950     J. STEPHEN     2,507,616
TORSION BEARING TYPE FIFTH WHEEL
Filed May 12, 1949     2 Sheets-Sheet 1
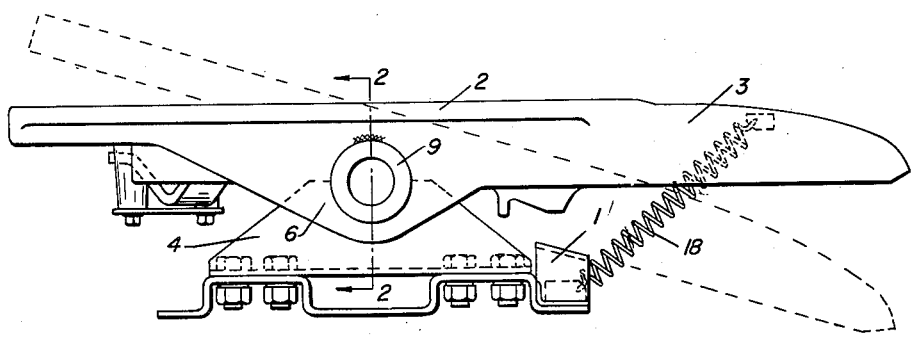
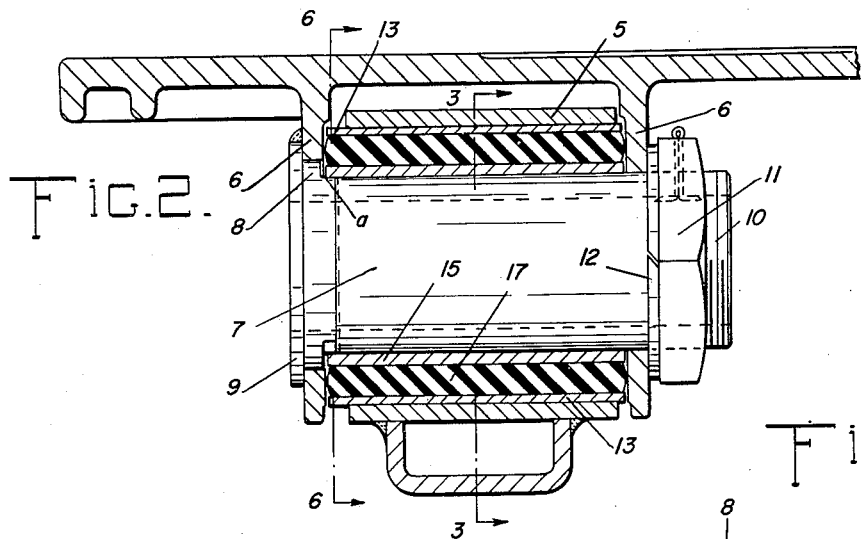
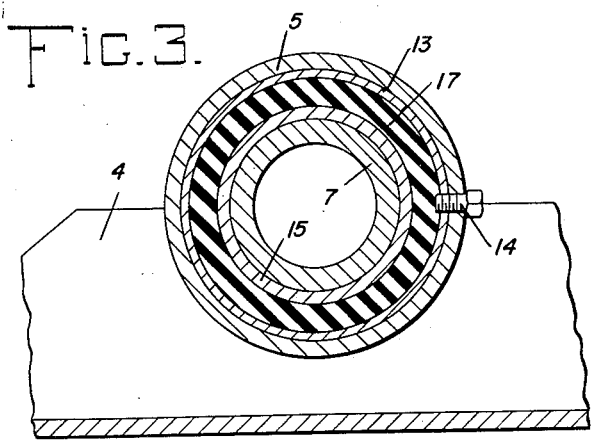
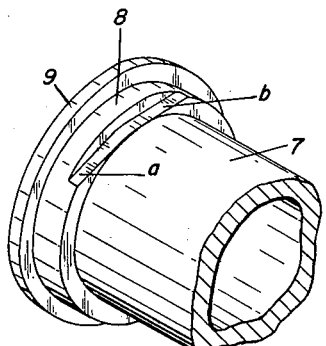
INVENTOR.
James Stephen
BY Robb & Robb
Attorneys May 16, 1950  J. STEPHEN  2,507,616
TORSION BEARING TYPE FIFTH WHEEL
Filed May 12, 1949  2 Sheets-Sheet 2

INVENTOR.
James Stephen
BY Robb & Robb,
Attorneys

Patented May 16, 1950

2,507,616

UNITED STATES PATENT OFFICE 2,507,616

TORSION BEARING TYPE FIFTH WHEEL

James Stephen, Edgerton, Wis., assignor to Highway Trailer Co., Edgerton, Wis., a corporation Application May 12, 1949, Serial No. 92,791

5 Claims. (Cl. 280—33.05)

My present invention relates to improvements in what are commonly known as fifth wheel units employed for connecting vehicle sections of tractor and trailer vehicles of which large numbers are utilized today in transportation.

The present invention especially improves upon the type of fifth wheel mounting means disclosed in my pending application for patent Serial No. 739,113, filed April 3, 1947, for Torsion bearing fifth wheel. In the construction of my invention of the application above identified, I employ mounting means between the fifth wheel and the supporting members or brackets carried by the tractor, which mounting means include a pair of transversely disposed torsion bearing units constituting the pivotal connection between the fifth wheel and the tractor on which it is mounted. The purpose in employing the torsion bearing units referred to, among other things, was to utilize the rubber torsion sleeve of the bearing unit to exert a normal stress or torsion action for causing the rear end of the fifth wheel normally to turn to a downward and rearwardly inclined position, which is the position in which it should stay in order to facilitate backing of the tractor into the trailer and coupling of the king pin of the trailer with the fifth wheel locking mechanism, also to maintain the said fifth wheel, with its rear end downwardly inclined, under conditions of travel of the tractor when the trailer is not coupled thereto.

It has been found, under actual conditions of service in operation, with fifth wheels equipped with the torsion bearing units of the invention of my previous application, that the actual operation of the torsion bearing members in many instances will not effectuate the desired objective stated. Due to physical phenomenon in the rubber member of the torsion bearing unit, in many instances after a certain period of use of the unit in the fifth wheel operation under actual conditions of use, the repeated torsional actions of the rubber members cause these members to lose their ability to fully return the fifth wheel to its downwardly and rearwardly inclined position, or limit of movement, and maintain said fifth wheel in such position, after the trailer is uncoupled from the fifth wheel on the tractor. Under these conditions, therefore, the fifth wheel, while on the tractor and disconnected from the trailer, will assume at its rear end a position elevated from the proper inclination for coupling, and therefore great care must be exercised that the wheel be actually moved down to its limit of rearward inclination before coupling operation is performed; otherwise there is liability of breakage engagement between the rear extremities of the fifth wheel and the front end of the trailer when the said fifth wheel extremities are too high to engage the king pin in the proper manner as the tractor is backed into the trailer. So far as I can determine, the ineffective action of the torsion rubber members of the torsion bearing units is due to the fact that said units as constructed according to my aforesaid pending application disclosure, in many instances, are subjected to so many torsional actions that the rubber of the rubber sleeve members loses its life or maximum inherent torsion facility, possibly due to the floating of the molecules of the rubber, or some physical phenomenon of which I am not aware. The design of the torsion bearing unit of my said application invention, therefore, has not been capable of affording the complete reliability of action to perform its functions referred to required for the purposes of fifth wheel usage in the manner herein described.

In the carrying out of my present invention I have designed a novel construction of torsion bearing fifth wheel, the torsion bearing units of which are so designed that the rubber elements or members thereof are not subjected to torsion stresses for the full distance of pivotal or tilting action of the fifth wheel. This distance is usually an amount of approximately 25° of rotation, and in the carrying out of my present invention the torsion stress on the rubber elements of the bushings is removed during approximately 10° of the maximum tilting action of the fifth wheel, and supplemental provisions are made in the nature of springs connected to the fifth wheel and to the tractor on which it is mounted, whereby to compel a downward movement of the rear end of the fifth wheel to its normal rearwardly inclined position for coupling, said springs acting upon the fifth wheel positively to carry the latter to said proper uncoupled position after the torsion action or effect of the rubber members of the torsion bearing units ceases to become operative on the fifth wheel.

The construction of my improved invention and the manner of its use, as well as the peculiar action of the parts thereof will become apparent upon reference to the following detail description in conjunction with the accompanying drawings, in which:

Figure 1 is a side view of a fifth wheel showing a fifth wheel unit and its mounting means for supporting the same upon a tractor, the fifth wheel being disposed in horizontal position as seen in full lines, and illustrated in dotted lines in its normal position of rearward inclination limited by a suitable stop, as when it is in its uncoupled position in relation to the king pin unit on the trailer.

Figure 2 is a sectional view taken about on the line 2—2 of Figure 1, bringing out more fully the details of construction and assembly of the parts of the torsion bearing unit in conjunction with the pivot members intermediate the fifth wheel and the supports on the tractor, the view being broken away and only one of the torsion bearing units and associated parts being shown.

Figure 3 is a fragmentary sectional view taken about on the line 3—3 of Figure 2.

Figure 4 is a fragmentary perspective view showing the special construction of the pivot bolt associated with each of the torsion bearing units.

I refer first to Figure 1, which affords a general illustration of what may be considered a conventional type of fifth wheel and its mounting means for supporting it on a tractor, excepting for the employment of torsion bearing units and certain spring means hereinafter to be described. The fifth wheel is the usual split type fifth wheel known to those versed in the art, comprising largely a platform body on which the bolster plate of the front end of a trailer is adapted to rest when the fifth wheel is coupled to a trailer, the fifth wheel being equipped with the usual locking mechanism for receiving and locking the king pin of the trailer vehicle, to said fifth wheel.

Figure 8:
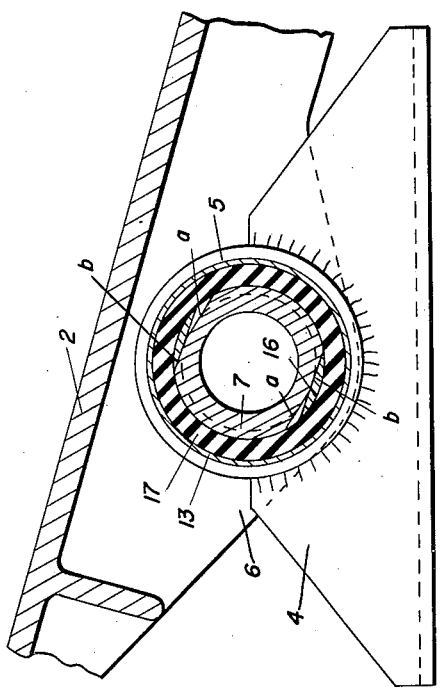

A fifth wheel such as illustrated in Figure 1 may be said to generally provide for a tilting action forwardly and rearwardly throughout a range of approximately 25½° of movement, 9° in a forwardly and downwardly tilting movement, and about 16½° from horizontal to its limit of rearward and downward movement as generally shown in Figure 8 of the drawings.

The dotted line position of Figure 1 for the fifth wheel may be said to be the position fragmentarily illustrated in Figure 8, and in said dotted line position the body of the fifth wheel is prevented from further downward movement by means of stops 1 on the tractor, as shown.

Now designating the parts of the fifth wheel, the body of the fifth wheel is generally designated 2 and the tail end of the fifth wheel, or rear end comprising usually the spaced parts in a split fifth wheel construction, is designated 3. The fifth wheel is mounted upon the tractor by any suitable supporting means, usually comprising a pair of spaced brackets one of which is shown in Figures 1 and 2, and other figures of the drawings, each bracket being designated 4 and being of generally U-form, and suitably bolted in place upon the rear end of the tractor forming one of the vehicle sections of the tractor-trailer combination. The bracket 4 supports, in respect to each of the bearing units between the fifth wheel and the tractor, an outer bearing sleeve or member 5 which is welded to the recessed sides of the bracket 4 so as to be rigid and immovable in respect to its said bracket 4. At each side of the fifth wheel 2 the latter is provided with depending apertured lugs or bearing members 6 that extend downwardly so that the bearing member 5 lies between the parts 6 while extending in the direction of its axis, the ends of the member 5 being juxtaposed to the inner faces of the said bearing lugs or members 6.

Fixed to the members 6 after being passed through the apertures therein is a hollow bolt 7, one end of which is very clearly shown in Figure 4 as of special construction.

Figure 7:
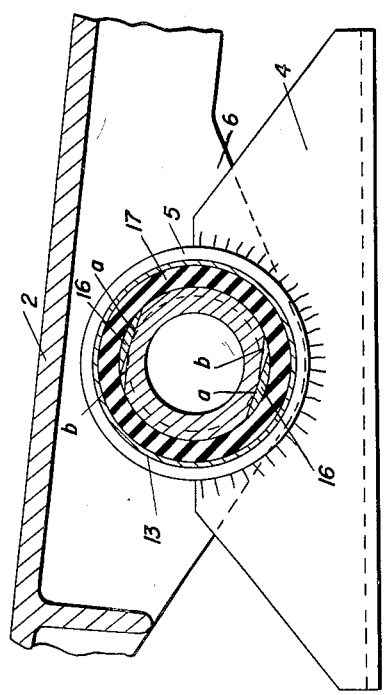
Figures 7 and 8 are views similar to Figure 6 but illustrating the positions of the parts relatively to each other when the fifth wheel assumes a partially rearwardly and downwardly inclined position, and when said wheel assumes its full downwardly and rearwardly inclined position at rest on the limiting stops, respectively.
Figure 6:
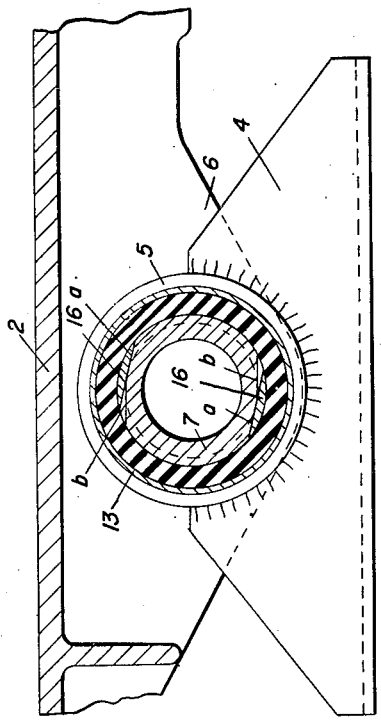
Figure 6 is a view in section taken about on the line 6—6 of Figure 2, showing more fully the relation between the abutment members on the inner sleeve of the torsion bearing in relation to the shoulders formed on the fixed pivot or axis bolt, when the fifth wheel is in horizontal position.

As seen in Figures 2 and 4, the bolt 7 is formed at one end with a head 8 of circular form provided with an outwardly disposed flange 9 at its outer face. This flange 9 is welded to one of the depending bearing members 6 as shown at the left in Figure 2 so as to connect the bolt 7 in a positive and stationary manner to the fifth wheel body 2 so as to turn when the said fifth wheel 2 tilts or rocks throughout its range of tilting movement. It will be observed that the head 8, according to Figure 4 illustration, is formed with a cut-out portion providing angularly disposed abutment shoulders $a$ and $b$. These shoulders are formed at diametrically opposite points in the body of the head 8 of the bolt as seen better in Figures 6, 7, and 8 of the drawings. At the end opposite the head 8 the bolt is formed with a threaded end section 10 for receiving a nut 11 between which nut and the adjacent lug or bearing member 6 a spring lock washer 12 is interposed.

Figure 5:
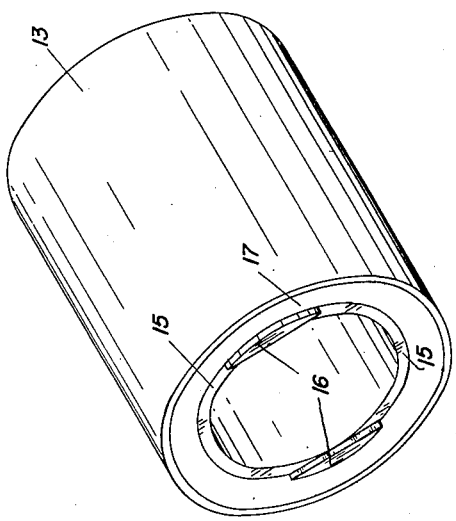
Figure 5 is a perspective view illustrating more fully the torsion bearing unit per se, including the outer metallic sleeve, the inner metallic sleeve, and the rubber body interposed therebetween and united to said sleeves by any suitable bonding, or other means, the formation of the abutment members on the end of the inner sleeve of said unit being clearly brought out.

I now refer to the torsion bearing utilized for the purposes of my invention and interposed between the bearing member 5 and the bearing bolt 7. The bearing member 5 is of considerably larger diameter than that of the bolt 7, and in the space between the two is interposed said torsion bearing which is made up of an outer sleeve 13 having a pressed fit connection connecting it in a fixed manner to the bearing member 5, in addition to a locking screw connection as seen in Figure 3 provided by the locking screw 14 which passes through a side of the bearing member 5 and through an opening in the said sleeve 13 of the torsion bearing. The torsion bearing includes also an inner sleeve 15 and this inner sleeve, as shown in Figure 5 of the drawings, is provided at one end and at diametrically opposite portions thereof, with abutment members 16 which project slightly axially from the adjacent extremity of the sleeve and are formed with facing flats on the inner sides thereof.

Between the sleeve 15 and the sleeve 13 of the torsion bearing unit is interposed the usual type of rubber torsion member 17 which is bonded or in some suitable manner fixed at its outer surface to the sleeve 13 and at its inner surface to the sleeve 15. The bolt 7 passes snugly through the sleeve 15 of the torsion bearing above described, and is designed to have slight relative movement respecting said sleeve 15 in a rotative direction for purposes to be now set forth.

It will be noted from Figure 1 of the drawings that I provide springs 18 of coiled type connecting the support means for the fifth wheel with the rear end of the fifth wheel at which the usual split tail portions of the latter are provided. Preferably I employ two of the springs 18, one at each side of the rear or tail end of the fifth wheel 2. In Figure 1 the fifth wheel 2 being shown in full lines in a horizontal position, the coil springs 18 are seen expanded and are under tension.

It will be assumed that the fifth wheel 2 in a construction typical for purposes of the present invention has a range of approximately 25½° of movement. As the wheel is seen in Figure 1, it is tilted downwardly and rearwardly, according to the dotted line position, an extent of approximately 16½° from horizontal. Under operating conditions, when the fifth wheel is connected to a trailer, the wheel may be tilted in a forward and downwardly leftward direction, as seen in Figure 1, to approximately 9° extent of movement, from the horizontal.

When the wheel 2 is tilted to the dotted position of Figure 8, which is in its uncoupled position, it will have assumed such position under partial torsion action of the member 17, and the downpulling action of the tensioned coil springs 18 which act upon the rear end of the fifth wheel to pull it downward the last 10° of its movement. Said springs will firmly maintain the fifth wheel at its dotted line position of Figure 1 under all conditions of the uncoupled condition of the uncoupled condition of the fifth wheel in relation to the trailer, so that there will be no liability of the rear end of the fifth wheel rising due to vibration or jar incident to travel movement of the tractor with the fifth wheel, when uncoupled from the trailer, thus preventing positioning of the fifth wheel in a dangerous up-tilted position wherein its coupling action might be unobtainable. Again, assuming that the fifth wheel is in the position shown in dotted lines in Figure 1 and the parts of the torsion bearing unit and other bearing members shown in Figure 4 are also in the position of Figure 8, when the tractor is backed into the trailer for coupling, the flats or abutment shoulders a of the bolt 7 are initially spaced from the flaps of the abutment members 16, and thus during the first 10° rise of the rear end of the fifth wheel, the torsion bearing is not under torsion stress. However, after the first 10° of movement of the rear end of the fifth wheel upwardly takes place, the parts are in the position of Figure 7, at which time the flats of the abutment members 16 become engaged by the shoulders a and the rubber torsion members 17 are put under torsion stress in a counterclockwise direction according to the showing in Figure 7, and will thereafter be maintained under stress, increasing as the wheel 2 assumes a horizontal position, and increasing more greatly if and when said fifth wheel is shifted to a forwardly and downwardly extending position inclining oppositely to the inclination illustrated by dotted lines in Figure 1.

Under the above conditions, therefore, the torsion bearing of the fifth wheel is under torsion stress during the last 6½° of movement of the rear end of the fifth wheel as it reaches the horizontal position shown in full lines in Figure 1, and also under torsion stress incident to any further articulation of the fifth wheel in a forwardly and downwardly extending direction at an opposite inclination to that shown in Figure 1 by the dotted line position of the fifth wheel.

Summing up, therefore, the torsion bearing in my present design of construction is only under torsion compression during a maximum of about 15½° of the entire movement of the fifth wheel in tilting. The remaining 10°, which is the final 10° of downward and rearward movement of the fifth wheel 2 to the dotted line position of Figure 1 is compelled by the springs 18 and the rubber of the torsion member is not, under these conditions, under torsion stress.

Recapitulating, therefore, it will be apparent that the rubber of the torsion bearing member 17 is not subject to torsion stresses throughout the maximum degree of articulation of the fifth wheel 2 in its rocking movement. Said rubber member 17 is not, therefore, subjected to the extensive torsion stresses that are incident to the operation of the corresponding member of my torsion bearing units as set forth in my previous application for patent, the torsion effects acting upon the fifth wheel being distributed between the members 17 of the torsion bearing units and the spring 18, the latter handling the torsion actions during approximately two-fifths of the range of tilting or articulation of the fifth wheel.

Having the foregoing in mind, therefore, it is apparent that the rubber material of the members 17 is not subjected to the degree of torsion stresses as in my prior invention construction, to such an extent as to interfere with the integrity of the rubber in a way decreasing its efficiency and rendering it unreliable to accomplish the desired purposes of my invention in affording sufficient torsional action to cause a certain extent of the articulating movement of the fifth wheel only, the balance of the torsion being obtained by the action of the springs 18. In the above manner the life of the torsion bearing unit, including the rubber members 17, is prolonged, and the bringing of the fifth wheel 2 to its maximum downwardly and rearwardly inclined position is ensured by reason of the mechanical action of the springs 18 in the manner set forth.

Stated otherwise than above, the construction set forth provides for about 10° free rotation between the bolt 7 and the inner sleeve or shell 15 of the torsion bushing. Thus, during tilting of the rear end of the fifth wheel 2 upward from its dotted position of Figure 1 for 10° the rubber of the torsion bearing is not under torsion. The bolt 7 is an axis pivot member.

Having thus described my invention, what I claim as new and desire to secure by Letters Patent of the United States is:

1. In a fifth wheel construction for tractor-trailer vehicles, in combination, a rocking fifth wheel, supporting means therefor including a bracket adapted to be attached to a tractor, a first hollow bearing member fixed to said bracket, bearing lugs on the fifth wheel receiving therebetween the first bearing member and having apertures alined with the hollow portion of the first bearing member, an axis bearing member passing through the lug apertures and the first bearing member to pivotally connect the fifth wheel and supporting bracket, means fixing the axis bearing member to one of said lugs to cause the axis member to turn as the fifth wheel rocks, a torsion bearing intermediate the first bearing member and the axis bearing member including an outer part fixed to the first bearing member, an inner part partially rotative on and relative to the axis bearing member, and a rubber torsion sleeve between side parts and fixed externally to one of said parts and internally to the other of said parts, said axis bearing member having means to engage the said inner part after a predetermined amount of rotation of the axis bearing member, to turn the inner part to set up torsion stress in the rubber sleeve tending to bias the fifth wheel to move in one direction, and means connected to the fifth wheel separate from the rubber sleeve to rock the fifth wheel in the direction of biassing by said rubber sleeve.

2. A construction as claimed in claim 1, in which the last means comprises a spring connected directly to the fifth wheel.

3. In a fifth wheel construction for tractor-trailer vehicles, in combination, a rocking fifth wheel, supporting means therefor including a bracket adapted to be attached to a tractor, and pivotal connecting means between the fifth wheel and said bracket enabling the wheel to rock on the bracket in opposite directions, and a torsion bearing forming a part of said pivotal connecting means and including a rubber torsion element and a member fixed to and operable upon rocking the fifth wheel to act to store up torsion in the rubber element to bias the wheel to tilt in one direction a limited distance, and devices connected to the fifth wheel to supplement the action of the rubber element to effect tilting movement of the fifth wheel a distance additional to the limited distance mentioned.

4. A construction as claimed in claim 3, in which the devices mentioned comprise springs attached to one end of the fifth wheel.

5. In a fifth wheel construction for tractor-trailer vehicles, in combination, a rocking fifth wheel, supporting means therefor including a bracket adapted to be attached to a tractor, a first hollow bearing member fixed to said bracket, bearing lugs on the fifth wheel receiving therebetween the first bearing member and having apertures alined with the hollow portion of the first bearing member, an axis bearing member passing through the lug apertures and the first bearing member to pivotally connect the fifth wheel and supporting bracket, means fixing the axis bearing member to one of said lugs, to cause the axis member to turn as the fifth wheel rocks, a torsion bearing intermediate the first bearing member and the axis bearing member including an outer part fixed to the first bearing member, an inner part partially rotative on and relative to the axis bearing member and having an end abutment member, and a rubber torsion sleeve between side parts and fixed externally to one of said parts and internally to the other of said parts, said axis bearing member having a shoulder to engage the said abutment member of the inner part after a predetermined amount of rotation of the axis bearing member, to turn the inner part to set up torsion stress in the rubber sleeve ending to bias the fifth wheel to move in one direction, and means connected to the fifth wheel separate from the rubber sleeve to rock the fifth wheel in the direction of biassing by said rubber sleeve.

JAMES STEPHEN.

REFERENCES CITED

The following references are of record in the file of this patent:

UNITED STATES PATENTS

| Number | Name | Date |
| --- | --- | --- |
| 2,359,499 | Walther et al. | Oct. 3, 1944 |
| 2,438,323 | Miller | Mar. 23, 1948 |